United States Patent [19]

Gerard

[11] Patent Number: 4,514,689
[45] Date of Patent: Apr. 30, 1985

[54] HIGH RESOLUTION POSITION SENSING APPARATUS WITH LINEAR VARIABLE DIFFERENTIAL TRANSFORMERS HAVING PHASE-SHIFTED ENERGIZING SIGNALS

[75] Inventor: William A. Gerard, Andover, Mass.

[73] Assignee: Varian Associates, Inc., Palo Alto, Calif.

[21] Appl. No.: 453,418

[22] Filed: Dec. 27, 1982

[51] Int. Cl.³ .................... G01B 7/14; H01F 21/06; G08C 19/08; G01R 33/00
[52] U.S. Cl. .................... 324/208; 318/657; 324/233; 340/870.36
[58] Field of Search ............ 324/207, 208, 227, 233, 324/241–243; 318/656, 657; 340/870.35, 870.36

[56] References Cited

U.S. PATENT DOCUMENTS

| | | | |
|---|---|---|---|
| 2,564,221 | 8/1951 | Hornfeck | 324/208 X |
| 2,769,969 | 11/1956 | Comstock | 340/196 |
| 2,866,153 | 12/1958 | Rhoades | 323/75 |
| 3,193,784 | 7/1965 | Lautzenhiser | 336/30 |
| 3,488,578 | 1/1970 | Stigmark | 324/34 |
| 3,573,444 | 4/1971 | Kawabata et al. | 235/151.3 |
| 4,059,789 | 11/1977 | Cocksedge | 318/657 X |
| 4,083,237 | 4/1978 | Levesque | 73/141 R |
| 4,134,065 | 1/1979 | Bauer et al. | 324/208 |
| 4,297,698 | 10/1981 | Pauwels et al. | 340/870.32 |
| 4,311,968 | 1/1982 | Pickering et al. | 331/90 |

FOREIGN PATENT DOCUMENTS 0844989  7/1981  U.S.S.R. .............. 324/208

Primary Examiner—Gerard R. Strecker
Attorney, Agent, or Firm—Stanley Z. Cole; William R. McClellan

[57] ABSTRACT

Apparatus for high resolution sensing of the position of a rapidly moving member. The apparatus includes at least two linear variable differential transformers (LVDT's) each having a magnetic core coupled to the movable member. A signal source and a phase shifter provide energizing signals to the primary coil of each LVDT. The energizing signals have the same frequency but are phase shifted relative to each other. The induced secondary voltages of the LVDT's are sampled by synchronous detectors, the outputs of which are combined by an adder into a high resolution output signal. When two LVDT's are utilized, the energizing signals have a relative phase shift of 90° and the effective position sampling rate is doubled. The apparatus can be used to sense the operating frequency of a tunable magnetron.

9 Claims, 3 Drawing Figures

HIGH RESOLUTION POSITION SENSING APPARATUS WITH LINEAR VARIABLE DIFFERENTIAL TRANSFORMERS HAVING PHASE-SHIFTED ENERGIZING SIGNALS

BACKGROUND OF THE INVENTION

This invention relates to high resolution sensing of the position of a linearly movable element and, more particularly, to apparatus for high resolution sensing of the position of a rapidly moving element such as a tuning shaft of a frequency agile magnetron.

It is frequently necessary to sense the position of a rapidly moving element with a high degree of resolution. One example of such a requirement occurs in the tuning of a frequency agile magnetron. The resonant frequency of the magnetron is rapidly varied by driving a tuning plunger at a high rate of speed. As the tuning plunger is driven, it is necessary to know the resonant frequency of the magnetron with high resolution. In general, the tuning plunger has a small total travel, typically less than one inch, but moves very rapidly, typically 0.25 inch/millisecond. To sense the position of the tuning plunger with high resolution requires a fast-acting sensing system. For example, when the speed is 0.25 inch/millisecond and a resolution of 0.005 inch is required, a minimum of 50,000 position samples per second must be taken.

Optical encoders in which an optical system counts lines on a moving piece of glass can achieve the required resolution. However, such optical encoders are too expensive in many applications, are subject to errors and create packaging problems, particularly where the equipment is required to operate in adverse environmental conditions.

Linear variable differential transformers (LVDT's) have also been used to accurately sense the position of a linearly movable element. The LVDT is an electromechanical device that produces an electrical output proportional to the displacement of a separate movable core. An ac voltage is applied to a primary coil. The voltage induced in two secondary coils depends on the position of the movable core, which is attached to the movable element of interest. The voltage induced in the secondary coils is sampled every cycle or every half cycle to provide sensing of the core position. LVDT's provide good linearity and high resolution when the core speed is relatively low. However, as the rate of travel of the core increases, the position resolution decreases for a given excitation frequency. The excitation frequency can be increased but, at higher excitation frequencies, the performance of the LVDT is degraded. Typically, the excitation frequency is limited to about 20 kilohertz, corresponding to a full-wave sampling rate of 40,000 samples per second. Therefore, in the past, LVDT's have been limited in their application to relatively low rates of core travel.

It is, therefore, an object of the present invention to provide novel high resolution position sensing apparatus.

It is another object of the present invention to provide apparatus for high resolution sensing of the position of a movable member during high speed linear translation thereof.

It is yet another object of the present invention to improve the resolution of position sensing apparatus incorporating linear variable differential transformers.

SUMMARY OF THE INVENTION

According to the present invention, these and other objects and advantages are achieved in apparatus for sensing of the position of a movable member during linear translation thereof. The apparatus comprises at least two linear variable differential transformers (LVDT's), each comprising a magnetic core coupled to the movable member, a primary coil and two series-connected secondary coils. The apparatus includes input means for providing an energizing signal to the primary coil of each LVDT. The energizing signals are each of the same frequency but are phase shifted relative to the other energizing signals and are operative to induce secondary voltages in the secondary coils of the LVDT's. The apparatus further includes output means for detecting the peak value and polarity of each secondary voltage and providing an output signal representative thereof. The peak value and polarity of each secondary voltage corresponds to the position of the respective magnetic core.

BRIEF DESCRIPTION OF THE DRAWINGS

For a better understanding of the present invention, together with other and further objects, advantages and capabilities thereof, reference may be had to the accompanying drawings which are incorporated herein by reference and in which.

DETAILED DESCRIPTION OF THE INVENTION

Figure 1:
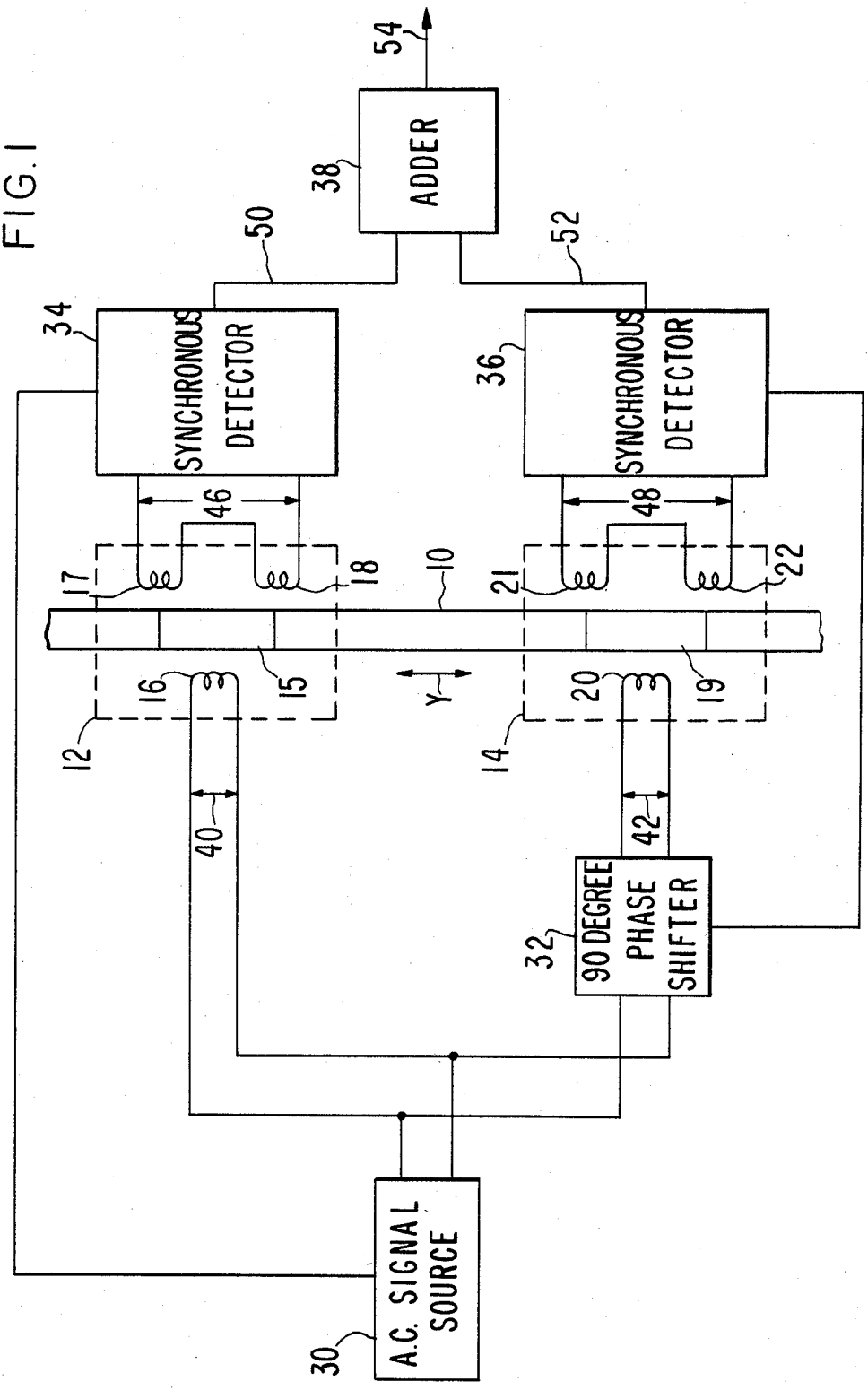
FIG. 1 is a schematic diagram of apparatus for high resolution position sensing in accordance with the present invention.

Apparatus in accordance with the present invention is illustrated in FIG. 1. A movable member 10 is linearly translated along the Y-axis by a drive means (not shown). Apparatus for sensing the position of the movable member 10 with high resolution includes a plurality of linear variable differential transformers (LVDT's), input means for providing an energizing signal to each of the LVDT's, and output means for detecting the outputs of the LVDT's and providing an output signal. An LVDT 12 includes a magnetic core 15 coupled to the movable member 10, a primary coil 16 and a pair of secondary coils 17, 18. An LVDT 14 includes a magnetic core 19, a primary coil 20 and a pair of secondary coils 21, 22. The primary and secondary coils of each LVDT are coaxially positioned and are arranged so that the amount of coupling between the primary coil and the secondary coils is dependent on the position of the magnetic core. An example of a suitable LVDT is a type 250 MHR (±0.25 inch travel, 10 kHz maximum operating frequency) manufactured by Schaevitz. Similar types can be operated up to 20 kHz. The input means of the sensing apparatus of FIG. 1 includes an ac signal source 30, which has an output coupled to the primary coil 16 of the LVDT 12, and a 90° phase shifter 32. The input to the phase shifter 32 is coupled to the output of the source 30. The output of the source 30 is typically a sine wave at about 20 kHz. The output of the phase shifter 32 is coupled to the primary coil 20 of the LVDT 14.

The secondary coils 17, 18 of the LVDT 12 are connected in series opposition so that the two induced secondary voltages are of opposite polarity. Similarly, the secondary coils 21, 22 of the LVDT 14 are connected in series opposition. The resultant secondary voltages which form the outputs of the LVDT's 12, 14 depend on the positions of the magnetic cores 15, 19, respectively. The output means of the sensing apparatus of FIG. 1 includes synchronous detectors 34, 36 and an adder 38. The synchronous detector 34 receives an input from the series-connected secondary coils 17, 18 and a synchronizing signal from the ac signal source 30. The synchronous detector 36 receives an input from the series-connected secondary coils 21, 22 and a synchronizing signal from the phase shifter 32. Each synchronizing signal is in phase with the respective energizing signal for each primary coil. The synchronous detectors 34, 36 detect the peak value and polarity of the resultant secondary voltages from the LVDT's 12, 14, respectively, and provide samples representative thereof. The adder 38 combines the samples provided by the synchronous detectors 34, 36 into an output signal.

When the primary coil of each LVDT is energized, voltages are induced in the secondary coils. The magnetic core provides a path for the magnetic flux linking the primary and secondary coils. Since the secondary coils are connected in series opposition, the net output of the LVDT is the difference between these voltages, which is zero when the core is at the center position. When the core is moved from the center position, the induced voltage in the coil toward which the core is moved increases, while the induced voltage in the opposite coil decreases. The resultant secondary voltage varies linearly with changes in core position and reverses phase as the core is moved from one side of the center position to the other.

Figure 2:
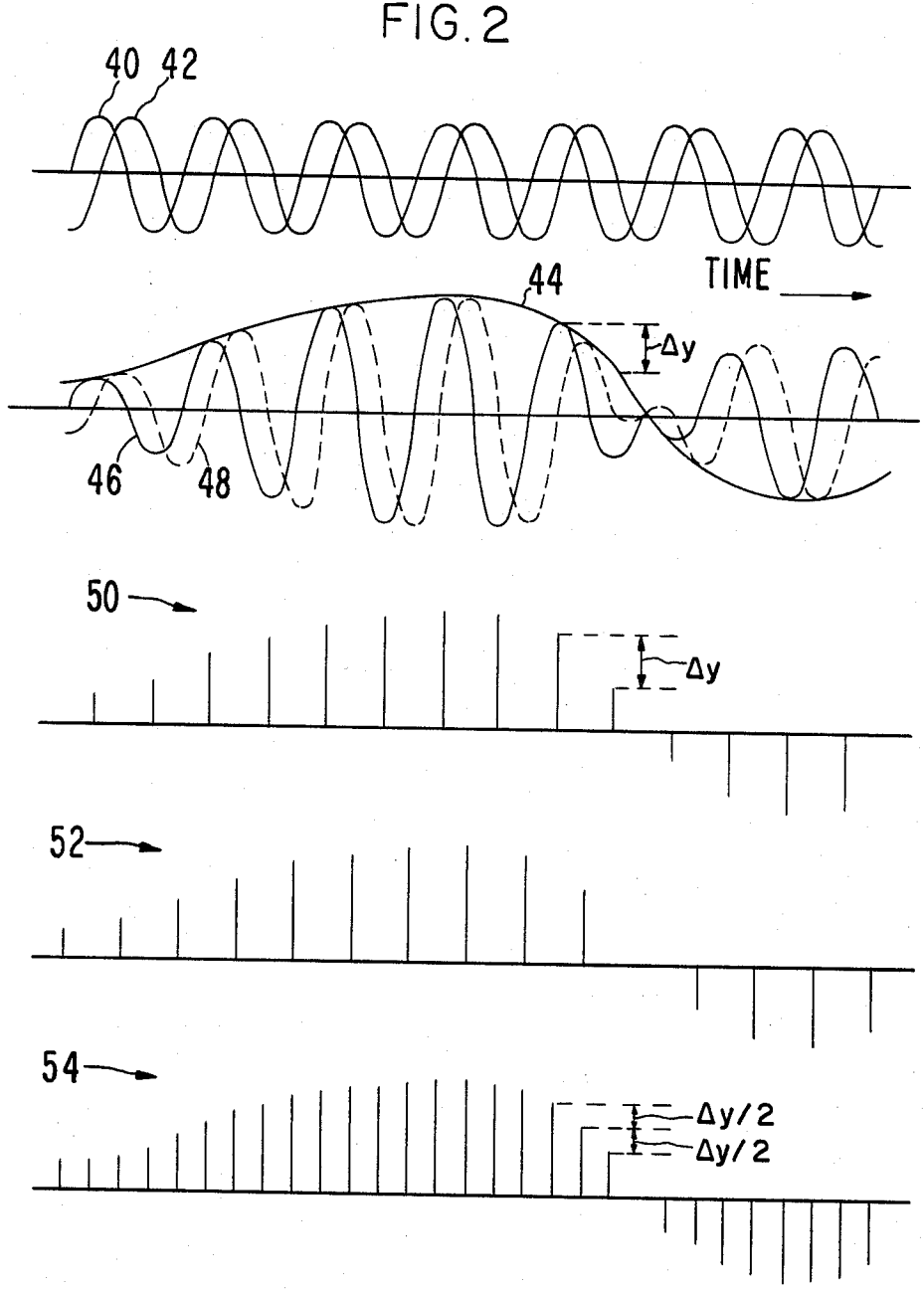
FIG. 2 is a graphic representation of the operation of the apparatus of FIG. 1.

The operation of the apparatus of FIG. 1 is described with reference to FIG. 2 which illustrates various quantities as a function of time. The location of each waveform is indicated by the corresponding reference numeral in FIG. 1. The various waveforms are arranged so that vertically aligned values occur simultaneously. The output of the source 30 is illustrated as a sinusoidal energizing signal 40, while the output of the phase shifter 32 is illustrated as a sinusoidal energizing signal 42, which is phase shifted from the signal 40 by 90°. The position of the movable element 10 at any instant is illustrated as a Y position 44. A zero value of the Y position 44 represents the position in which the magnetic cores 15, 19 are centered in the LVDT's 12, 14, respectively. The resultant voltage induced in the secondary coils 17, 18 is illustrated as a secondary voltage 46, while the resultant voltage induced in the secondary coils 21, 22 is illustrated as a secondary voltage 48. The amplitudes of the secondary voltages 46, 48 vary linearly with respect to the Y position 44 of the movable element 10. Furthermore, it is noted that the secondary voltages 46, 48 reverse polarity when the Y position 44 reverses polarity, that is, when the magnetic cores 15, 19 pass through the center position of the respective LVDT's 12, 14.

The outputs of the synchronous detectors 34 and 36 are illustrated as secondary voltage samples 50, 52, respectively. The secondary voltage samples 50 represent the peak value and polarity of the secondary voltage 46, while the secondary voltage samples 52 represent the peak value and polarity of the secondary voltage 48. Synchronous detectors 34, 36 operate in accordance with known detection techniques. For example, the zero crossings of the synchronizing signal (either from the source 30 or from the phase shifter 32) are detected and, after a delay of one-quarter cycle, the secondary voltage is sampled. This insures that the samples are taken at the peak value of the secondary voltages 46, 48. The samples are taken on both the positive and negative half cycles of the secondary voltages 46, 48 to obtain the maximum number of data points. Since the secondary voltages 46 and 48 are phase shifted by 90° relative to each other, secondary voltage samples 50 are likewise shifted in time relative to the samples 52. When the Y position 44 of the movable element 10 is negative, the secondary voltages 46, 48 are of the opposite polarity from the respective energizing signals 40, 42, and the corresponding secondary voltage samples 50, 52 are negative. The adder 38 adds the secondary voltage samples 50 and 52 to form an output signal 54 having samples which occur at twice the rate of the samples in either of the secondary voltage samples 50, 52. When, for example, the energizing signals 40, 42 have a frequency of 20 kHz, the samples 50, 52 have a repetition rate of 40 kHz due to the full wave sampling of the secondary voltages 46, 48, and the output signal 54 has a repetition rate of 80 kHz.

As noted hereinabove, LVDT's have a maximum prescribed operating frequency and thus a limited resolution when the Y position 44 of the movable element 10 is rapidly changing. The apparatus of FIG. 1 doubles the effective resolution by employing two LVDT's and phase shifted energizing signals. The improvement in resolution is illustrated in FIG. 2. Between successive secondary voltage samples 50, the Y position 44 can change by an amount $\Delta Y$. Therefore, a single LVDT producing a single set of secondary voltage samples 50 has a resolution of $\Delta Y$. The resolution is improved to $\Delta Y/2$ when the sampling rate of the Y position 44 is doubled, as indicated by the illustration of the output signal 54 in FIG. 2. Thus, there is provided apparatus for doubling the resolution in position sensing without increasing the operating frequency of the LVDT.

The resolution in measuring the position of a movable element can further be improved by increasing the number of LVDT's used to sense the position of the movable element. When three LVDT's are used, the energizing signals are shifted by 0°, 60°, and 120° to provide an effective tripling of the sampling rate. Similarly, when four LVDT's are used, the energizing signals are shifted by 0°, 45°, 90°, and 135° to result in a quadrupling of the sampling rate. Furthermore, alternate sampling techniques can be employed. For example, the samples of the secondary voltages 46, 48 can be converted directly to digital form by analog-to-digital converters coupled to the respective LVDT outputs. A high resolution output signal can be provided by gating of the analog-to-digital converter outputs. There is no requirement that the magnetic cores 15, 19 be arranged in a collinear fashion. The requirement is that each of the magnetic cores be coupled to the movable element so that all move together as a unit.

Figure 3:
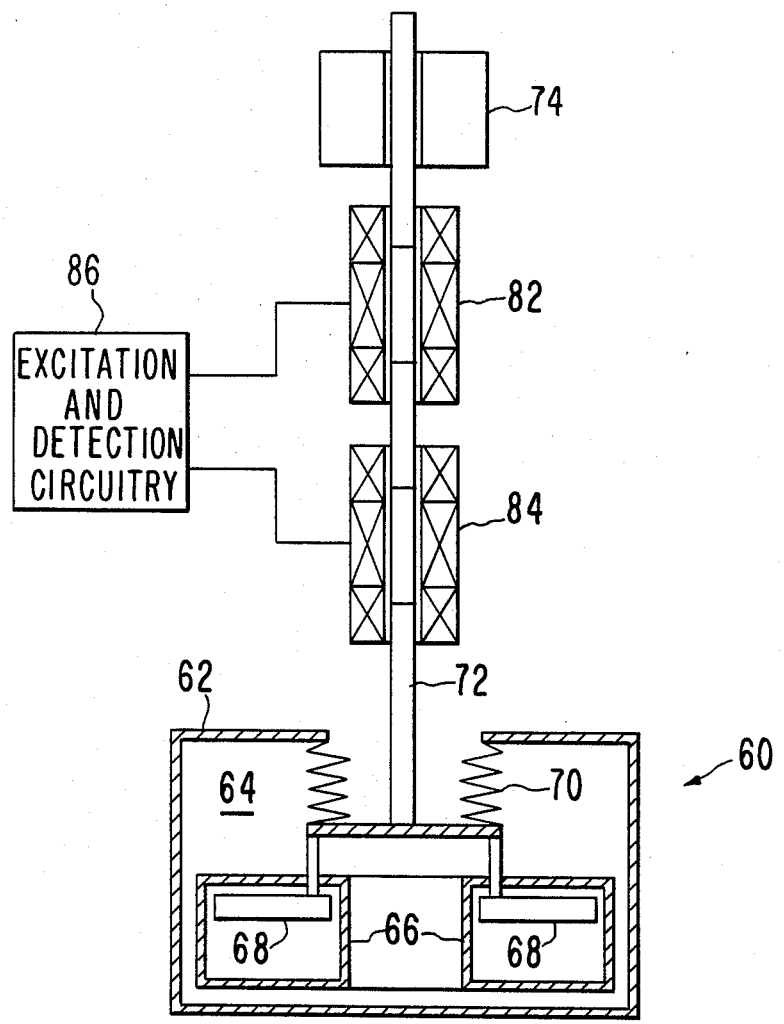
FIG. 3 is a schematic diagram illustrating the application of the apparatus of FIG. 1 to a tuned resonant cavity device.

An application of the apparatus of FIG. 1 to the monitoring of the frequency of a resonant cavity device is illustrated in FIG. 3. A tunable, resonant cavity device 60 includes a vacuum envelope 62 which encloses a sealed vacuum chamber 64. Located within the vacuum envelope 62 is a resonant cavity 66 which can be annular in shape. The resonant cavity 66 has an associated resonant frequency which can be altered by movement of a tuning plunger 68. The tuning plunger 68 is coupled to a tuning assembly which functions to vary the position of the tuning plunger 68 in accordance with a prescribed tuning pattern. Tuning plunger 68 is coupled through a bellows 70 to an elongated tuning shaft 72 external to the vacuum chamber 64. The tuning shaft 72 is coupled to a drive means such as a linear motor 74, which is operative to drive the shaft 72 and the tuning plunger 68 at a high rate of speed. One specific example of such a resonant cavity device is a frequency agile coaxial magnetron. Coaxial magnetrons are known generally in the art and include additional elements not shown in FIG. 3.

Apparatus for high resolution sensing of the position of the tuning shaft 72 includes LVDT's 82, 84 which are mounted coaxially with respect to the tuning shaft 72. The LVDT's 82, 84 correspond to the LVDT's 12, 14 shown in FIG. 1 and described hereinabove. The magnetic cores of the LVDT's 82, 84 are incorporated into the tuning shaft 72 and move with it. The LVDT's 82, 84 are coupled to excitation and detection circuitry 86, which includes elements corresponding to the signal source 30, the phase shifter 32, the synchronous detectors 34, 36 and the adder 38, as shown in FIG. 1. The position sensing apparatus of FIG. 3 operates the same as the apparatus shown in FIG. 1 and described hereinabove. Each position of the tuning shaft 72 corresponds to a prescribed operating frequency of the resonant cavity 66. The position sensing apparatus, therefore, is used to monitor the operating frequency of the resonant cavity device 60.

While there has been shown and described what is at present considered the preferred embodiments of the invention, it will be obvious to those skilled in the art that various changes and modification may be made therein without departing from the scope of the invention as defined by the appended claims.

What is claimed is:

1. Apparatus for sensing the position of a movable member, comprising:
   a plurality of position transducer means each comprising a magnetic core coupled to said movable member, a primary coil and two series-connected secondary coils;
   input means for providing an energizing signal to said primary coil of each transducer means, said energizing signals having the same frequency but having differing relative phases and being operative to induce in said secondary coils secondary voltages of differing relative phases; and
   output means for detecting the peak value and polarity of each half cycle of said secondary voltages of differing phases and providing a composite output signal representative of said peak values and polarities, said output signal indicating the position of said movable member at a rate of n times the frequency of said energizing signal where n is the number of said transducer means.

2. The apparatus as defined in claim 1 wherein said input means includes ac signal source means and phase shift means for providing phase shifted energizing signals.

3. The apparatus as defined in claim 2 wherein said output means includes synchronous detectors coupled to the secondary coils of each of said transducer means and operative to provide a sample of the peak value and polarity of each secondary voltage and means for combining said samples into said output signal.

4. The apparatus as defined in claim 3 wherein said energizing signals are phase shifted so that the samples in said output signal are equally spaced in time, whereby said output signal has a frequency which is an integral multiple of the frequency of said energizing signals.

5. The apparatus as defined in claim 4 wherein said plurality of transducer means includes two LVDT's and said energizing signals are phase shifted from each other by 90°.

6. The apparatus as defined in claim 4 wherein said means for combining said samples includes an adder for adding said samples.

7. The apparatus as defined in claim 1 wherein said movable member is an elongated shaft which is translated linearly and each of said plurality of transducer means is mounted coaxially with respect to said shaft.

8. The apparatus as defined in claim 7 wherein said elongated shaft is coupled to a tuning plunger in a resonant cavity device whereby the resonant frequency of said resonant cavity device is varied by translation of said shaft.

9. The apparatus as defined in claim 8 wherein said resonant cavity device is a magnetron.

* * * * *